US009998013B2

(12) United States Patent
Malinin

(10) Patent No.: US 9,998,013 B2
(45) Date of Patent: Jun. 12, 2018

(54) MOSFET DRIVER WITH REDUCED POWER CONSUMPTION

(71) Applicant: DIALOG SEMICONDUCTOR INC., Campbell, CA (US)

(72) Inventor: Andrey B. Malinin, Fort Collins, CO (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days. days.

(21) Appl. No.: 15/306,854

(22) PCT Filed: May 1, 2015

(86) PCT No.: PCT/US2015/028675
§ 371 (c)(1),
(2) Date: Oct. 26, 2016

(87) PCT Pub. No.: WO2015/171436
PCT Pub. Date: Nov. 12, 2015

(65) Prior Publication Data
US 2017/0047849 A1 Feb. 16, 2017

Related U.S. Application Data

(60) Provisional application No. 61/990,038, filed on May 7, 2014.

(51) Int. Cl.
*H02M 3/335* (2006.01)
*H02M 1/36* (2007.01)
(Continued)

(52) U.S. Cl.
CPC ......... *H02M 3/33507* (2013.01); *H02M 1/08* (2013.01); *H02M 1/36* (2013.01);
(Continued)

(58) Field of Classification Search
CPC ...... H02M 3/33507; H02M 1/08; H02M 1/36; H02M 3/33523; H02M 2001/0009; H02M 2001/0032; Y02B 70/16
(Continued)

(56) References Cited

U.S. PATENT DOCUMENTS 6,188,587 B1 2/2001 Yun et al.
8,018,743 B2 * 9/2011 Wang ................ H02M 3/33507
323/284

(Continued)

FOREIGN PATENT DOCUMENTS

CN 102340245 A 2/2012

OTHER PUBLICATIONS

Received STIC search report from EIC 2800 searcher Samir Patel dated Jun. 30, 2017.*

(Continued)

*Primary Examiner* — Timothy J Dole
*Assistant Examiner* — Htet Z Kyaw
(74) *Attorney, Agent, or Firm* — Fenwick & West LLP

(57) ABSTRACT

A power supply can be operated in a low power mode by adjusting the pulses provided to a power supply switch until a pulse resulting in a reduced amount of power that exceeds a minimum power threshold required by a load coupled to the power supply switch is identified. For each successive switching cycle, a pulse causing a lower power to be provided to the load is produced. When a pulse is produced that causes a power to be provided to the load that does not exceed the minimum power threshold required by the load, a subsequent pulse is produced that causes a greater power to be provided to the load than the previous pulse. If the greater power exceeds the minimum power threshold, the subsequent pulse is stored and similar pulses are provided for the remainder of the low power mode.

21 Claims, 3 Drawing Sheets

(51) Int. Cl.
*H02M 1/08* (2006.01)
*H02M 1/00* (2006.01)

(52) U.S. Cl.
CPC ............ *H02M 3/33523* (2013.01); *H02M 2001/0009* (2013.01); *H02M 2001/0032* (2013.01); *Y02B 70/16* (2013.01)

(58) Field of Classification Search
USPC ..................................... 363/21.12–21.18
See application file for complete search history.

(56) References Cited

U.S. PATENT DOCUMENTS

| | | | |
|---|---|---|---|
| 8,049,481 B2 | 11/2011 | Li et al. | |
| 8,098,502 B2* | 1/2012 | Mao | H02M 1/44 363/21.03 |
| 8,144,487 B2* | 3/2012 | Djenguerian | H02M 3/33507 363/21.04 |
| 9,154,039 B2* | 10/2015 | Li | H02M 3/33507 |
| 9,318,965 B2* | 4/2016 | Schroeder gen Berghegger | H02M 3/33546 |
| 9,543,819 B2* | 1/2017 | Kong | H02M 1/08 |
| 2005/0073862 A1* | 4/2005 | Mednik | H02M 3/33523 363/20 |
| 2008/0049457 A1* | 2/2008 | Choi | H02M 1/44 363/21.12 |
| 2010/0054000 A1* | 3/2010 | Huynh | H02M 3/33507 363/21.16 |
| 2010/0157636 A1 | 6/2010 | Li et al. | |
| 2010/0164455 A1* | 7/2010 | Li | H02M 3/157 323/283 |
| 2010/0165672 A1* | 7/2010 | Li | H02M 3/157 363/21.16 |
| 2010/0195355 A1* | 8/2010 | Zheng | H02M 3/33507 363/21.12 |
| 2010/0208500 A1* | 8/2010 | Yan | H02M 3/33523 363/21.12 |
| 2011/0096572 A1* | 4/2011 | Liang | H02M 1/36 363/21.12 |
| 2011/0096573 A1* | 4/2011 | Zhu | H02M 3/33523 363/21.17 |
| 2011/0096574 A1 | 4/2011 | Huang | |
| 2011/0149614 A1 | 6/2011 | Stracquadaini | |
| 2012/0176819 A1* | 7/2012 | Gao | H02M 1/36 363/21.12 |
| 2012/0250367 A1* | 10/2012 | Desimone | H02M 1/44 363/21.17 |
| 2013/0088898 A1* | 4/2013 | Gao | H02M 3/335 363/21.16 |
| 2013/0107584 A1* | 5/2013 | Li | H02M 1/08 363/21.12 |
| 2013/0121032 A1 | 5/2013 | Shi et al. | |
| 2013/0148387 A1* | 6/2013 | Ren | H02M 1/36 363/21.16 |
| 2013/0181635 A1* | 7/2013 | Ling | H02M 3/33507 315/297 |
| 2013/0235621 A1* | 9/2013 | Yan | H02M 3/33507 363/21.12 |
| 2014/0016375 A1* | 1/2014 | Gao | H02M 3/33523 363/21.16 |
| 2014/0036549 A1* | 2/2014 | Li | H02M 3/33507 363/21.12 |
| 2014/0063867 A1* | 3/2014 | Djenguerian | H02M 3/33507 363/21.17 |
| 2014/0098576 A1* | 4/2014 | Schroeder gen Berghegger | H02M 3/33523 363/21.04 |
| 2014/0098577 A1* | 4/2014 | Schroeder gen Berghegger | H02M 3/33523 363/21.04 |
| 2014/0268915 A1* | 9/2014 | Kong | H02M 3/33592 363/21.14 |
| 2014/0268919 A1* | 9/2014 | Yao | H02M 3/33523 363/21.15 |
| 2014/0301116 A1* | 10/2014 | Zhang | H02M 3/33515 363/21.15 |
| 2014/0355316 A1* | 12/2014 | Wu | H02M 3/335 363/21.16 |
| 2015/0244273 A1* | 8/2015 | Schaemann | H02M 3/33523 363/21.18 |
| 2016/0276936 A1* | 9/2016 | Gritti | H02M 1/4258 |
| 2017/0012538 A1* | 1/2017 | Barrenscheen | H02M 3/33507 |

OTHER PUBLICATIONS

Received STIC search report from EIC 2800 searcher Benjamin Martin dated Jun. 29, 2017.*

PCT International Search Report and Written Opinion, PCT/US2015/028675, dated Sep. 17, 2015, 16 Pages.

Mappus, S., "Optimizing MOSFET Characteristics by Adjusting Gate Drive Amplitude," Jun. 2005, Application Report SLUA341 [retrieved on Aug. 31, 2015] Retrieved from the Internet: <URL: http://www.tl.com/lit/an/slua341/slua341.pdf>.

Chinese First Office Action, Chinese Application No. 201580020337.1, Mar. 28, 2018, 15 pages.

* cited by examiner

MOSFET DRIVER WITH REDUCED POWER CONSUMPTION

RELATED APPLICATIONS

The application claims priority to U.S. Provisional Application No. 61/990,038, filed May 7, 2014, the contents of which are hereby incorporated in their entirety.

BACKGROUND

The present invention relates generally to power supply driver circuits, and more specifically, to a switching power supply driver circuit with reduced power consumption.

Switching power supplies utilize a transistor, such as a MOSFET, and a driving circuit configured to switch the transistor on and off. Power is provided to a load coupled to a switching power supply by controlling the switching of the transistor at a primary side of the power supply. The resulting power pulses provide power to a secondary side of the power supply, which in turn provides power to the load. To reduce power during standby modes, the frequency of power pulses provided by the power supply can be reduced, though doing so can cause the power provided to a load to sag as the load current increases. Alternatively, the capacitance of a secondary side capacitor can be increased, though doing so increases power supply costs.

BRIEF DESCRIPTION OF DRAWINGS

The teachings of the embodiments of the present invention can be readily understood by considering the following detailed description in conjunction with the accompanying drawings.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF EMBODIMENTS

The Figures (Fig.) and the following description relate to the preferred embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
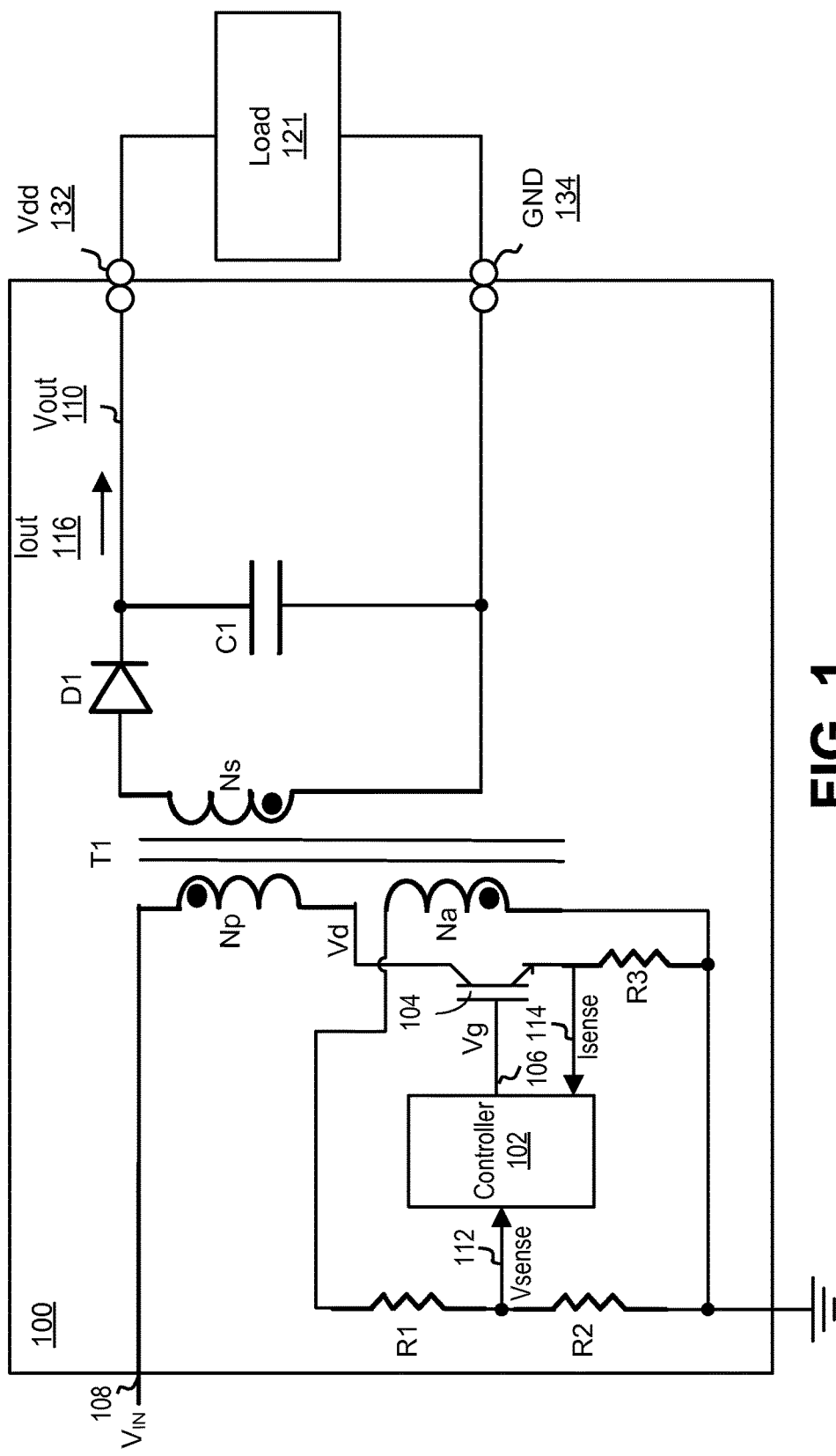
FIG. 1 is a circuit diagram illustrating an AC to DC flyback switching power supply, according to one embodiment.

FIG. 1 is a circuit diagram illustrating an AC to DC flyback switching power supply, according to one embodiment. The switching power converter 100 of FIG. 1 is a primary-side fly-back switching power converter configured to provide power to a load 121 via a Vdd node 132 and a GND node 134. The load 121 can be any electronic device configured to receive power from the switching power converter 100, for example an LED. The switching power converter 100 includes, among other components, a transformer T1 having a primary winding Np, a secondary winding Ns, and an auxiliary winding Na, a switch 104 (e.g., a MOSFET transistor), a controller 102, an output rectifier diode D1, resistors R1, R2, R3, and output filter capacitor C1. It should be noted that although a flyback switching power converter is illustrated in the embodiment of FIG. 1, the principles described herein apply equally to other power converters.

An input voltage ($V_{IN}$) 108, typically a rectified AC voltage, is provided to the power converter 100. The controller 102 controls the on state and the off state of switch 104 using switch control signal 106. When the switch 104 is turned on, the switch is configured as a closed switch, allowing current to flow through the switch. When the switch 104 is turned off, the switch is configured as an open switch, preventing current from flowing through the switch. The switch control signal 106 may control the switching of the switch 104 using, for example, pulse width modulation (PWM) or pulse frequency modulation (PFM).

When the switch 104 is turned on, energy is stored in the primary side windings Np of the transformer T1. The voltage across the secondary winding Ns is negative and the diode D1 is reverse biased, blocking transfer of energy to electronic device 121. In this state, energy is supplied to the load 121 via the capacitor C1. When the switch 104 is turned off, the energy stored in the primary winding Np of the transformer T1 is released to the secondary winding Ns of the transformer T1. In this state, the diode D1 becomes forward biased, enabling a transfer of the energy stored in the transformer T1 to the load 121 and re-charging the capacitor C1.

The resistors R1 and R2 form a voltage divider coupled in series with the auxiliary winding Na of the transformer T1, producing the sense voltage ($V_{SENSE}$) 112, which can be used to estimate the output voltage ($V_{OUT}$) 110. The resistor R3 is coupled in series with the switch 104 to produce a voltage ($I_{SENSE}$) 114 which can be used in conjunction with $V_{SENSE}$ to estimate the output current $I_{OUT}$ 116 through the load 121.

In normal operation, the controller 102 monitors $V_{SENSE}$ 112 and/or $I_{SENSE}$ 114 and controls switching of the switch 104 to maintain a regulated output. For example, in a constant voltage mode (CVM), the controller 102 controls switching of the switch 104 to maintain $V_{OUT}$ 110 substantially near a desired regulation voltage $V_{REF}$ (for example, within an allowable error range). In a constant current mode (CCM), controller 102 controls switching of the switch 104 to maintain $I_{OUT}$ 116 substantially near a desired regulation current $I_{REF}$ (for example, within an allowable error range).

In alternative embodiments, controller 102 may perform only voltage regulation (without enabling a current regulation mode) and may therefore omit the current sense $I_{SENSE}$ feedback signal.

In some embodiments, the controller 102 generates the switch control signal 106 based on the received values of the voltage feedback signal $V_{SENSE}$ and the current feedback signal $I_{SENSE}$. As noted above, the switch control signal 106 controls the on/off states of the switch 104. In general, the controller 102 can implement any number of control schemes suitable for switch-mode power converters 100, such as pulse-width-modulation (PWM), pulse-frequency-modulation (PFM), or any other suitable control scheme or combination thereof. In one embodiment, the controller 102 outputs a control signal that causes the ON time (or duty cycle) of the switch 104 to increase, during a certain switching cycle in order to increase power delivery to the load during that switching cycle, or to decrease in order to decrease power delivery to the load during that switching cycle.

The primary side auxiliary winding Na of the transformer T1 allows for a low voltage $V_{SENSE}$ 112 to be generated because the voltage can be scaled down based on the turn ratio of the secondary winding Ns and the auxiliary winding Na. However, in an alternative embodiment, auxiliary winding Na may be omitted, and $V_{SENSE}$ may instead be detected by directly monitoring the voltage across primary winding Np.

The controller 102 can be configured to operate in a low power mode. Low power modes can be implemented, for instance, in response to a determination that a load requires a low amount of power for operation, in response to a determination that the amount of power that a load requires will not change in an upcoming period of time, or in response to a determination that the load itself will not change in an upcoming period of time. The controller 102 can select to operate in the low power mode, or can configured itself to operate in a low power in response to an external input received by the controller 102.

In the low power mode, the energy per pulse provided by the primary side of the power converter 100 is reduced. The primary contributors to the amount of energy per pulse provided by power converter 100 are:
 1. The energy dissipated in the switch when turning the switch on in a switching cycle due to parasitic capacitance of the switch
 2. The energy delivered to the load 121

As used herein, "low power mode" can refer to regulation of the energy delivered to a load coupled to a switching power supply by adjusting the energy or charge delivered to a gate node of a switching power supply MOSFET. In contrast, "normal power mode" can refer to the regulation of the energy delivered to a load coupled to the switch power supply by adjusting the "on" time of the MOSFET (in a pulse width modulation mode) or by adjusting the time between pulses provided to the MOSFET with a fixed "on" time (in a pulse frequency modulation mode).

Reducing switch on time will not reduce the energy dissipated in the switch, which is dependent only on the drain voltage across the switch. Reducing switch on time will also not reduce the energy delivered to the load 121, which is dependent on the current provided to the load, which increases even after the switch is configured to the off state. Accordingly, in order to reduce the energy per pulse provided by the power converter 100, the controller 102 can discharge the output capacitance of the switch 104 only partially (as opposed to fully discharging the output capacitance of the switch). By only partially discharging the output capacitance of the switch 104, the amount of energy dissipated when turning on the switch decreases, and the output power provided to the load 121 decreases. However, the output capacitance of the switch 104 must be discharged enough to provide a required minimum amount of power to the load 121.

As used herein, "partially discharging the output capacitance of the switch" refers to the discharging of the output capacitance of the switch 104 by an amount greater than a first threshold and less than a second threshold, the first threshold associated with a corresponding output energy greater than an energy threshold required by a load, and the second threshold associated with a corresponding output energy associated with operation in a normal power mode. Accordingly, when operating in a low power mode, low power switch control signals 106 (or "gate pulses") are provided by the controller 102 to the switch 104 such that each low power switch control signal 106 only partially discharges the output capacitance of the switch. In some embodiments, the low power switch control signals 106 include an amplitude and duration based on a pre-determined or stored low power switch control signal. In other embodiments, the low power switch control signals 106 are determined based on an iterative process, for instance during a training mode or when transitioning from a normal power mode to a low power mode, by varying the amplitude and duration of provided switch control signals until a satisfactory low power control signal is determined as described below.

Accordingly, the controller 102 can be configured to implement an algorithm to reduce the energy per pulse provided by the power converter 100 while still providing a threshold amount of power required by the load 121 while the power converter is operated in a low power mode. In such embodiments, the controller 102 iteratively reduces the amount by which the output capacitance of the switch 104 is discharged in successive switching cycles when the power converter 100 enters the low power mode until an optimal energy per pulse is determined. The threshold amount of power required by the load 121 can be pre-determined and stored at the controller 102, can be determined during operation by the controller based on a property of the load (for instance, based on the amount of light emitted by an LED load), or can be received at the controller from an external source during operation. It should be noted that although reference is made herein to a comparison between an output power provided to the load and a minimum threshold power required by the load, other embodiments can determined and compare an output current or voltage provided to the load to a minimum threshold current or voltage, respectively, required by the load.

When the power converter 100 enters the low power mode, the output capacitance of the switch 104 is fully discharged. After discharging the output capacitance of the switch 104, the controller determines if the output power provided to the load 121 exceeds a required minimum power. If the output power does exceed a required minimum, the output capacitance of the switch 104 is discharged less in the next switching cycle. If, for any given switching cycle, the output power does not exceed the required minimum, a second pulse is immediately provided in the same switching cycle by increasing the amount that the output capacitance of the switch 104 is discharged. If the second pulse results in the output power provided to the load 121 exceeding the required minimum, then the second pulse is stored, and the output capacitance of the switch 104 is discharged at the level that produced the second pulse for all switching cycles for the remainder of operation in low power mode. If the second pulse does not result in the output power provided to the load 121 exceeding the required minimum, then the power converter 100 exits low power mode.

Figure 2A:
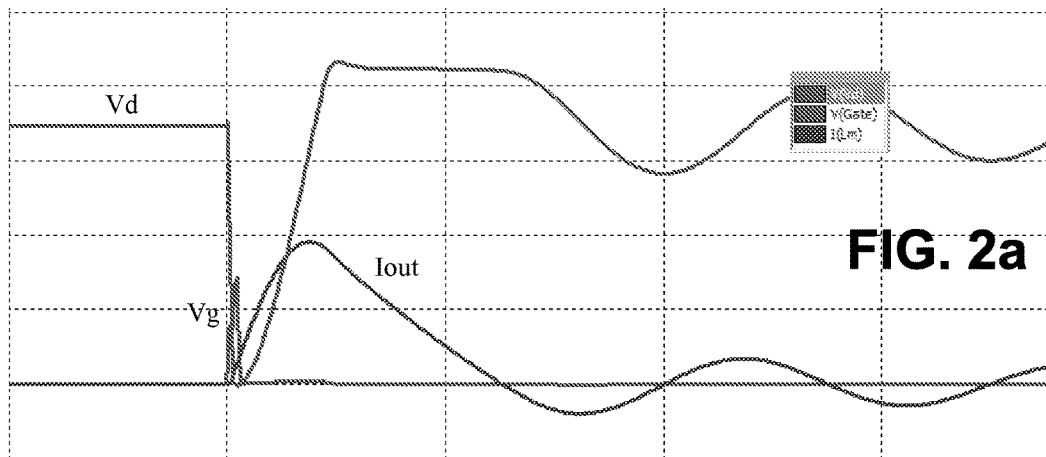
FIG. 2a is a graph illustrating the output current provided to a load when the output capacitance of a switch is fully discharged, according to one embodiment.

FIG. 2a is a graph illustrating the output current provided to a load when the output capacitance of a switch is fully discharged, according to one embodiment. In the embodiment of FIG. 2a, the controller 102 provides a pulse signal to the gate of the switch 104 (the switch control signal 106, or Vg, of FIG. 1). The magnitude of the pulse of Vg causes the output capacitance of the switch 104 (the drain voltage Vd of FIG. 1) to fully drain, and the output current (Iout of FIG. 1) to rise to a first magnitude.

Figure 2B:
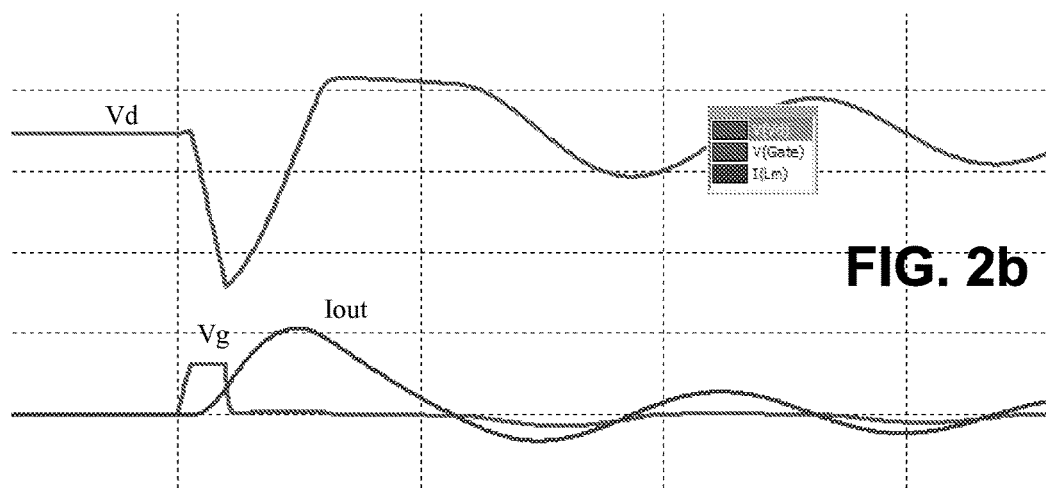
FIGS. 2b and 2c are graphs illustrating the output current provided to a load when the output capacitance of a switch is only partially discharged, according to one embodiment.
Figure 2C:
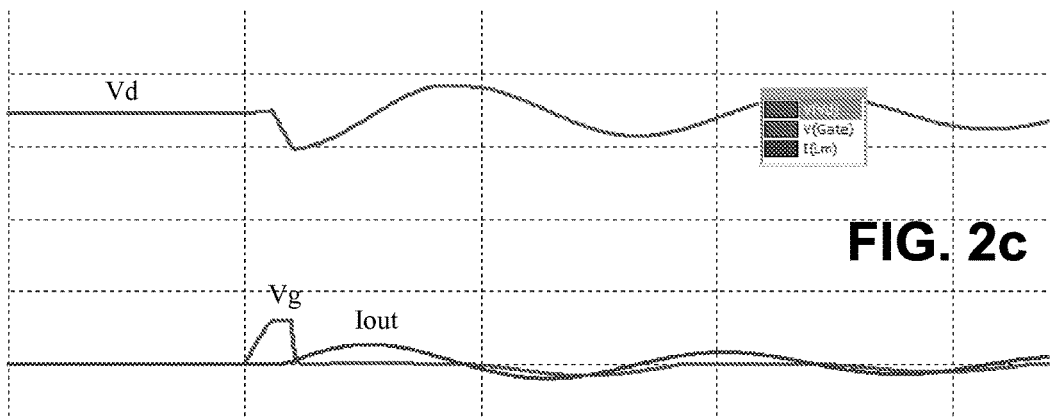

FIGS. 2b and 2c are graphs illustrating the output current provided to a load when the output capacitance of a switch is only partially discharged, according to one embodiment. In the embodiment of FIG. 2b, the controller 102 provides a pulse signal Vg that is lower in magnitude than the pulse signal Vg of FIG. 2a, causing the output capacitance of the switch 104 to be partially discharged, and the output current Iout to rise to a second magnitude less than the first magnitude of FIG. 2a. In the embodiment of FIG. 2c, the controller 102 provides a pulse signal Vg that is lower in magnitude than the pulse signal Vg of FIG. 2b, causing the output capacitance of the switch 104 to be discharged less than in the embodiment of FIG. 2b, and the output current Iout to rise to a third magnitude less than the second magnitude of FIG. 2b.

The embodiments of FIGS. 2a-2c can represent an implementation of an algorithm by the controller 102 to reduce the energy per pulse provided by the power converter 100 as described herein. In the event that the power converter 100 enters a low power mode, the controller 102 provides a pulse that fully discharges the output capacitance of the switch 104 in a first switching cycle. In this example, the first switching cycle is illustrated by FIG. 2a. If the output power (represented by Iout of FIG. 2a) provided to the load 121 exceeds a minimum power required by the load, then the controller 102 proceeds to a second switching cycle.

In the second switching cycle, the controller provides a pulse that discharges the output capacitance of the switch 104 less than in the first switching cycle. In this example, the second switching cycle is illustrated by FIG. 2b. If the output power provided to the load 121 exceeds the minimum power threshold, then the controller 102 proceeds to a third switching cycle. In the third switching cycle, the controller provides a pulse that discharges the output capacitance of the switch 104 less than in the second switching cycle. In this example, the third switching cycle is illustrated by FIG. 3b. If, during any switching cycle, the output of power provided to the load 121 does not exceed a required minimum power threshold, a second pulse is provided in the same switching cycle that discharges the more than the first pulse of the switching cycle. If the second pulse results in an output power provided to the load that exceeds the minimum power threshold, then the second pulse is saved (for instance at the controller 121 in a non-transitory computer-readable storage medium), and the same pulse is provided for all switching cycles for the remainder of operation in the low power mode. For example, if the power provided in the third cycle illustrated in FIG. 2c (the output current Iout multiplied by the voltage provided to the load) does not exceed the required minimum threshold, the controller can discharge the output capacitance of the switch 104 more than in the embodiment of FIG. 2c (for instance, the output capacitance of the switch can be discharged by an amount equal to or less than in the second switching cycle illustrated in FIG. 2b but greater than in the third switching cycle illustrated in FIG. 2c).

To vary the amount that the output capacitance of the switch 104 is discharged, the controller 102 can vary the magnitude of the signal Vg provided to the gate node of the switch. In the embodiment of FIG. 1, the controller 121 can determine the amount of output power provided to the load 121 based on the signals $V_{SENSE}$ or $I_{SENSE}$ 114. In other embodiments, the power converter 100 can include a power sensor component or circuit coupled to the auxiliary winding Na of the transformer T1. In such embodiments, the power sensor component or circuit can be configured to determine an amount of power provided to the load 121, and to provide an indication of the determined amount of power to the controller 102. In some embodiments, the controller 102 can compare the power provided to the load 121 to a minimum threshold required by the load as described herein. Alternatively, a power sensor component or circuit coupled to the auxiliary winding Na of the transformer T1 can determine an amount of power provided to the load 121, can compare the determined amount of power to a minimum threshold required by the load, and can provide an indication of the determination to the controller 102. In response, the controller 102 can control the switching of the switch 104 based on the received indication of the determination of whether the output power exceeds the required minimum threshold as described herein.

Upon identifying a pulse that, when provided by the controller 102 to the switch 104, results in a reduced amount of power being provided to the load 121 while exceeding the minimum power required by the load (also referred to as an "optimized pulse" hereinafter), the controller can provide the identified pulse to the switch for the remainder of the low power mode. During operation in the low power mode, the amount of power provided to the load can be continually monitored, for instance during each switching cycle. If, during a switching cycle, the monitored amount of output power falls below the minimum required threshold, a second pulse can be immediately generated within the switching cycle, either at the same power or at an increased power (such that the second pulse discharges the output capacitance of the switch 104 more than the first pulse). If the second pulse does not cause power provided to the load to exceed the minimum threshold, the power converter 100 can exit the low power mode (and, for example, resume normal operation).

It should be noted that in addition to identifying an optimized gate pulse for a MOSFET switch for operation in a low power mode by successively reducing the amount of energy provided to a load coupled to a power converter, an optimized pulse can be identified by successively increasing an amount of energy provided to the load. For instance, upon entering a low power mode or a training mode, a first pulse can be provided to a MOSFET gate. The first pulse can be associated with a first output energy provided to a load that is below a threshold energy required by the load. In response to determining that the first output energy is less than the required threshold output energy, a second pulse can be provided to the MOSFET gate, the second pulse associated with a second output energy greater than the first output energy. In response to determining that the second output energy is below the required threshold output energy, a third pulse associated with a third output energy greater than the second output energy can be provided to the MOSFET gate. This process is iterated until a pulse associated with an output energy greater than the threshold output energy (the "optimized pulse") is identified. As noted above, optimized pulses can be stored for subsequent use in controller a MOSFET switch when operating in a low power mode.

Figure 3:
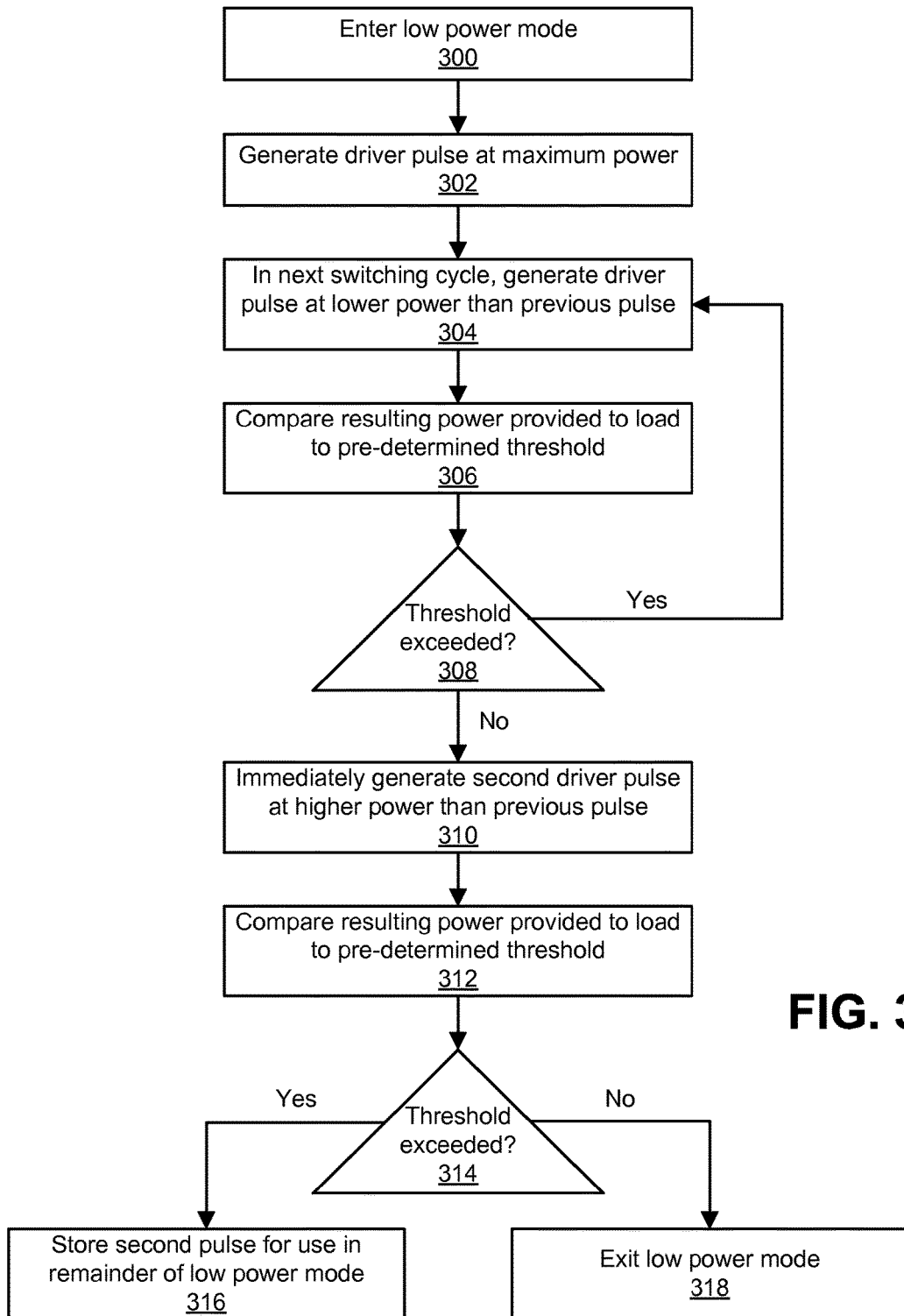
FIG. 3 is a flow chart illustrating a process for reducing the energy per pulse provided by a power converter in a low power mode, according to one embodiment.

FIG. 3 is a flow chart illustrating a process for reducing the energy per pulse provided by a power converter in a low power mode, according to one embodiment. A power supply, such as a flyback switching power supply, enters 300 a low power mode, for instance in response to a determination that a load coupled to the supply will remain constant for an upcoming period of time. A driver pulse is generated 302 at a maximum power (a predetermined power guaranteed to provide a suitable amount of output power to a load). For example, a controller generates a gate signal for a MOSFET switch of a flyback switching power supply such that the output capacitance from the drain node of the switch to the source node of the switch is completely drained.

In the next switching cycle, a driver pulse is generated 304 at a power lower than the previous pulse (in this case, the maximum power). The amount of power provided to the load coupled to the power supply in response to the driver pulse is determined, and is compared 306 to a pre-determined minimum power threshold required by the load. In response to a determination 308 that the determined amount of power exceeds the threshold, a driver pulse is generated in the next switching cycle at a lower power than the previous pulse. The cycle is repeated until the power provided to the load in response to a generated driver pulse does not exceed the minimum threshold required by the load.

In response to a determination 308 that the determined amount of power does not exceed the minimum threshold, a second pulse is immediately generated 310 within the same switching cycle at a higher power than the previous pulse within the switching cycle. The power provided to the load resulting from the second pulse is compared 312 to the minimum threshold. In response to a determination 314 that the power provided to the load by the second pulse exceeds the threshold, the second pulse is stored 316 for use for the remainder of the low power mode. In response to a determination 314 that the power provided to the load by the second pulse does not exceed the threshold, the power supply exists 318 the low power mode.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described herein.

What is claimed is:

1. A method for operating a flyback switching power converter coupled to a load, the power converter comprising a MOSFET switch and a controller coupled to the MOSFET switch, comprising:
   configuring the power converter to operate in a low power mode;
   generating, by the controller, a first driver pulse voltage, an amplitude of the first driver pulse voltage configured to partially discharge an output capacitance of the MOSFET switch; and
   after generating the first driver pulse voltage, generating, by the controller, a second driver pulse voltage, an amplitude of the second driver pulse voltage being smaller than the amplitude of the first driver pulse voltage and based on a feedback control signal representative of a voltage provided to the load.

2. The method of claim 1, wherein the amplitude of the first driver pulse voltage and the amplitude of the second driver pulse voltage exceed a pre-defined value.

3. The method of claim 2, wherein the pre-defined value is determined in advance by adjusting the amplitude of driver pulse voltages provided to the MOSFET switch until an optimized driver pulse voltage associated with a pre-defined threshold voltage provided to the load is determined, the pre-defined value representative of the amplitude of the optimized driver pulse voltage.

4. The method of claim 3, wherein the optimized driver pulse voltage is determined by:
   generating a third driver pulse voltage configured to discharge the output capacitance of the MOSFET switch by a first amount and to provide a first amount of output power to the load coupled to the power converter, the first amount of output power exceeding a minimum power threshold required by the load; and
   generating a fourth driver pulse voltage configured to discharge the output capacitance of the MOSFET switch by a second amount less than the first amount and to provide a second amount of output power to the load, the second amount of output power less than the first amount of output power;
   wherein the optimized driver pulse voltage comprises the third driver pulse voltage in response to a determination that the second amount of output power does not exceed the minimum power threshold.

5. The method of claim 3, wherein the optimized driver pulse voltage is determined by:
   generating a third driver pulse voltage configured to discharge the output capacitance of the MOSFET switch by a first amount and to provide a first amount of output power to the load coupled to the power converter; and
   responsive to a determination that the first amount of output power does not exceed a minimum power threshold required by the load, generating a fourth driver pulse voltage configured to discharge the output capacitance of the MOSFET switch by a second amount greater than the first amount and to provide a second amount of output power to the load, the second amount of output power greater than the first amount of output power;
   wherein the optimized driver pulse voltage comprises the fourth driver pulse voltage in response to a determination that the second amount of output power exceeds the minimum power threshold.

6. The method of claim 1, wherein the MOSFET switch is configured to operate at a fixed on-time while receiving driver pulse voltages of adjusted drive power when the power converter is configured in the low power mode.

7. A flyback switching power converter circuit, comprising:
   a MOSFET switch;
   a transformer coupled to the MOSFET switch and to a load; and
   a controller coupled to a gate node of the MOSFET switch, the controller configured to, when operating in a low power mode:
   generate a first driver pulse voltage, an amplitude of the first driver pulse voltage configured to partially discharge an output capacitance of the MOSFET switch; and after generating the first driver pulse voltage, generate a second driver pulse voltage, an amplitude of the second driver pulse voltage being smaller than the amplitude of the first driver pulse voltage and based on a feedback control signal representative of a voltage provided to the load.

8. The power converter circuit of claim 7, wherein the amplitude of the first driver pulse voltage and the amplitude of the second driver pulse voltage exceed a pre-defined value.

9. The power converter circuit of claim 8, wherein the pre-defined value is determined in advance by adjusting the amplitude of driver pulse voltages provided to the MOSFET switch until an optimized driver pulse voltage associated with a pre-defined threshold voltage provided to the load is determined, the pre-defined value representative of the amplitude of the optimized driver pulse voltage.

10. The power converter circuit of claim 9, wherein the optimized driver pulse is determined by:
  generating a third driver pulse voltage configured to discharge the output capacitance of the MOSFET switch by a first amount and to provide a first amount of output power to the load, the first amount of output power exceeding a minimum power threshold required by the load; and
  generating a fourth driver pulse voltage configured to discharge the output capacitance of the MOSFET switch by a second amount less than the first amount and to provide a second amount of output power to the load, the second amount of output power less than the first amount of output power;
  wherein the optimized driver pulse voltage comprises the third driver pulse voltage in response to a determination that the second amount of output power does not exceed the minimum power threshold.

11. The power converter circuit of claim 9, wherein the optimized driver pulse voltage is determined by:
  generating a third driver pulse voltage configured to discharge the output capacitance of the MOSFET switch by a first amount and to provide a first amount of output power to the load coupled to the power converter; and
  responsive to a determination that the first amount of output power does not exceed a minimum power threshold required by the load, generating a fourth driver pulse voltage configured to discharge the output capacitance of the MOSFET switch by a second amount greater than the first amount and to provide a second amount of output power to the load, the second amount of output power greater than the first amount of output power;
  wherein the optimized driver pulse voltage comprises the fourth driver pulse voltage in response to a determination that the second amount of output power exceeds the minimum power threshold.

12. The power converter circuit of claim 7, wherein the MOSFET switch is configured to operate at a fixed on-time while receiving driver pulse voltages of adjusted drive power when the converter is configured to operate in the low power mode.

13. A method for operating a flyback switching power converter, comprising:
  configuring the power converter to operate in a low power mode;
  generating a first driver pulse voltage configured to discharge an output capacitance of a switch of the power converter by a first amount and to provide a first amount of output power to a load coupled to the power converter, the first amount of output power exceeding a minimum power threshold required by the load;
  after generating the first driver pulse voltage, generating a second driver pulse voltage smaller than the first driver pulse voltage and configured to discharge the output capacitance of the switch by a second amount less than the first amount and to provide a second amount of output power to the load, the second amount of output power less than the first amount of output power;
  after generating the second driver pulse voltage and responsive to a determination that the second amount of output power does not exceed the minimum power threshold, generating a third driver pulse voltage greater than the second driver pulse voltage and configured to discharge the output capacitance of the switch by a third amount greater than the second amount and to provide a third amount of output power to the load, the third amount of output power greater than the second amount of output power;
  responsive to a determination that the third amount of output power exceeds the minimum power threshold, storing the third driver pulse voltage for use during the remainder of the low power mode; and
  responsive to a determination that the third amount of output power does not exceed the minimum power threshold, configuring the power converter to stop operation in the low power mode.

14. The method of claim 13, wherein the switch comprises a MOSFET switch, and wherein the first driver pulse voltage, the second driver pulse voltage, and the third driver pulse voltage are generated by a controller coupled to the gate node of the MOSFET switch.

15. The method of claim 14, wherein each driver pulse voltage configures the MOSFET switch to operate as a closed switch.

16. The method of claim 15, wherein a primary winding of a transformer is coupled to the MOSFET switch, and wherein current flowing through the primary winding when the MOSFET switch is configured to operate as a closed switch causes current to flow through a secondary winding of the transformer coupled to the load.

17. The method of claim 16, wherein an auxiliary winding of the transformer is coupled to the controller, and wherein the controller is configured to determine amounts of output power provided to the load in response to a current flowing through auxiliary winding of the transformer.

18. The method of claim 13, further comprising:
  after storing the third driver pulse voltage, for each switching cycle in which the power converter is configured to operate in the low power mode:
    generating a first driver pulse voltage for the switching cycle based on the stored third driver pulse voltage;
    determining a first amount of power for the switching cycle provided to the load in response to the generated first driver pulse voltage for the switching cycle;
    in response to a determination that the determined first amount of power for the switching cycle does not exceed the minimum power threshold, generating a second driver pulse voltage for the switching cycle within the same switching cycle;
    determining a second amount of power for the switch cycle provided to the load in response to the generated second driver pulse voltage for the switching cycle; and in response to a determination that the determined second amount of power for the switching cycle does not exceed the minimum power threshold, configuring the power converter to stop operation in the low power mode.

19. The method of claim 18, wherein the second driver pulse voltage for the switching cycle discharges the output capacitance of the switch by the same amount as the first driver pulse voltage for the switching cycle.

20. The method of claim 18, wherein the second driver pulse voltage for the switching cycle discharges the output capacitance of the switch by a greater amount than the first driver pulse voltage for the switching cycle.

21. The method of claim 20, further comprising:
in response to a determination that the determined second amount of power for the switching cycle exceeds the minimum power threshold, generating a driver pulse voltage for each subsequent switching cycle in which the power converter is configured to operate in the low power mode based on the generated second driver pulse voltage for the switching cycle.

\* \* \* \* \*